US010162626B2

(12) United States Patent
Mavrinac et al.

(10) Patent No.: US 10,162,626 B2
(45) Date of Patent: Dec. 25, 2018

(54) ORDERED CACHE TIERING FOR PROGRAM BUILD FILES

(71) Applicant: Microsoft Technology Licensing, LLC, Redmond, WA (US)

(72) Inventors: Erik C. Mavrinac, Bothell, WA (US); John Thomas Erickson, Mercer Island, WA (US); Vinod Sridharan, Bellevue, WA (US); Dandan He, Bellevue, WA (US); Wolfram Schulte, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/483,845

(22) Filed: Apr. 10, 2017

(65) Prior Publication Data
US 2018/0293068 A1 Oct. 11, 2018

(51) Int. Cl.
*G06F 9/44* (2018.01)
*G06F 8/70* (2018.01)
*G06F 12/0897* (2016.01)
*G06F 8/36* (2018.01)

(52) U.S. Cl.
CPC .......... *G06F 8/70* (2013.01); *G06F 8/36* (2013.01); *G06F 12/0897* (2013.01); *G06F 2212/1008* (2013.01); *G06F 2212/1048* (2013.01)

(58) Field of Classification Search
CPC .......... G06F 8/36; G06F 8/70; G06F 12/0897; G06F 2212/1008; G06F 2212/1048
USPC ................... 717/106–113, 120–123
See application file for complete search history.

(56) References Cited

U.S. PATENT DOCUMENTS

| 7,818,402 | B1 | 10/2010 | Zhang | |
| 8,032,700 | B2 * | 10/2011 | Bruce | G06F 3/061 711/113 |
| 8,161,244 | B2 * | 4/2012 | Krishnaprasad | G06F 12/0813 711/121 |
| 8,688,900 | B2 * | 4/2014 | Eleftheriou | G06F 12/0246 711/103 |

(Continued)

FOREIGN PATENT DOCUMENTS

WO 2007131190 A2 11/2007

OTHER PUBLICATIONS

Soroker et al., "Pegboard: A Framework for Developing Mobile Applications", 2006, ACM, pp. 138-150.*

(Continued)

*Primary Examiner* — Ted T. Vo
(74) *Attorney, Agent, or Firm* — Workman Nydegger

(57) ABSTRACT

Technologies that allow for a significant reduction in the time required to incrementally build large computer programs, and increase in the scale of build systems that perform builds. The time reduction is caused by reducing the time required for processing systems in a distributed build system to acquire files needed for the respective processing system to perform their respective part of the build. The scale increase comes from relying on local processing systems instead of centralized processing systems. This is done by establishing a tier of cache locations on which appropriate files for a build may be found by the appropriate processing system. A system may be established that allows for the processor systems to validate that the files have not been tampered with by using signatures, and were appropriately identified.

20 Claims, 5 Drawing Sheets

(56) References Cited

U.S. PATENT DOCUMENTS

| | | |
|---|---|---|
| 9,317,430 B2 * | 4/2016 | Soundararajan .... G06F 12/0811 |
| 2005/0262076 A1 | 11/2005 | Voskuil |
| 2006/0026567 A1 | 2/2006 | Mcvoy et al. |
| 2007/0150948 A1 | 6/2007 | De spiegeleer |
| 2008/0066049 A1 | 3/2008 | Jain et al. |
| 2009/0265473 A1 | 10/2009 | Hydrie et al. |
| 2012/0144378 A1 | 6/2012 | Shah |
| 2013/0067427 A1 | 3/2013 | Fox et al. |
| 2013/0159365 A1 | 6/2013 | Boctor et al. |
| 2014/0279830 A1 | 9/2014 | Majumdar et al. |
| 2015/0261525 A1 | 9/2015 | Kwon et al. |

OTHER PUBLICATIONS

Won Yoo, "Browse Cached Contents on Disk on Application Request Routing", 2009, posted on Microsoft Docs, https://docs.microsoft.com/en-us/iis/extensions/configuring-application-request-routing-arr/browse-cached-contents-on-disk-on-application-request-routing, 4 pages.*

Microstrategy, "Different type of Caches Available in Microstrategy", 2014, retrieved from http://microstrategy99.blogspot.com/2012/09/caching.html, 3 pages.*

Rawson, Rob, "Comparison of Version Control Software: SVN, Git, Mercurial", https://biz30.timedoctor.com/git-mecurial-and-cvs-comparison-of-svn-software/, Retrieved on: Oct. 20, 2016, 23 pages.

* cited by examiner

ORDERED CACHE TIERING FOR PROGRAM BUILD FILES

BACKGROUND

Computing systems and associated networks have greatly revolutionized our world. Computing systems operate via the use of software, which includes instructions that instruct the hardware of a computing system to operate in particular ways. Software is often initially drafted using source code that has semantics that are more recognizable and readable to a trained human coder. A software "build" involves the construction of an observable and tangible result using the source code. For instance, the result of a software build might include standalone software artifacts that can be run on a computer, or might include software in an interpreted language.

Modern computer programs may be quite large, often involving more than a million lines of source code and thousands of executable components (e.g., components, functions, objects, and the like). Build systems are often used in such large-scale software development projects. The build systems can typically be distributed across multiple build processing systems that each perform a portion of the entire build. The source code files, themselves, are typically stored in a centralized repository.

The build process can be extremely intricate and complex for such large computer programs. Furthermore, builds of such large computer programs occur incrementally, with potentially many incremental builds being performed prior to the final product represented by the computer program being ready to deploy. Nevertheless, it is a matter of considerable complexity to identify source code files that have changed since the last build, identify files that are dependent upon those source code files, retrieve those files onto the appropriate processing system of the build system, and build the resulting executable artifacts. Thus, even an incremental build can take substantial time for large computer programs.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to technologies that allow for a significant reduction in the time required to incrementally build large computer programs, and to significantly increase the scale of build systems needed to produce those builds. The time reduction is caused by reducing the time required for processing systems in a distributed build system to acquire files needed for the respective processing system to perform their respective part of the build. The scale increase is caused by the use of processing system caches and peer cache retrieval to reduce reliance on centralized resources.

This is done by establishing a tier of cache locations on which appropriate files for a build may be found by the appropriate processing system (e.g., a build worker). For instance, the files may be found on the processing system's own cache, or perhaps on a peer processing system in which the file may be retrieved without having to use an intervening computing system that operates above the routing layer. Build assignments may even be made by a scheduler in a manner to increase the likelihood that the appropriate files will be found at lower latency tiers in the ordered cache locations. Furthermore, when a subject processing system retrieves a file for its part of the build, it may publish the availability of the file on the processing system, particularly for those processing systems in which the subject processing system serves as a lower level cache location (e.g., for a peer processing system).

In accordance with some embodiments described herein, a system may be established that allows for the processing systems to validate that the files have not been tampered with by using signatures, and were appropriately identified. Such signatures may be used by ingestor components that search for and identify files that have been changed since the last build (and files that depend from those changed files), and logs the change in a centralized repository along with an indication of the appropriate credentials (e.g., a certificate chain) to be used in validating the signature. Thus, the efficient build may be securely performed.

Embodiments described herein also allow for builds to be performed in the context of increased scale and complexity of build systems. If many builds a day are to be performed, processing systems on the order of thousands or even more may be used in very large build systems to handle so many builds. Each processing system involved in a build needs its own copies of source code. Many or most or all of those processing systems may need to retrieve source code simultaneously. The principles described herein permit this to happen in an orderly way.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
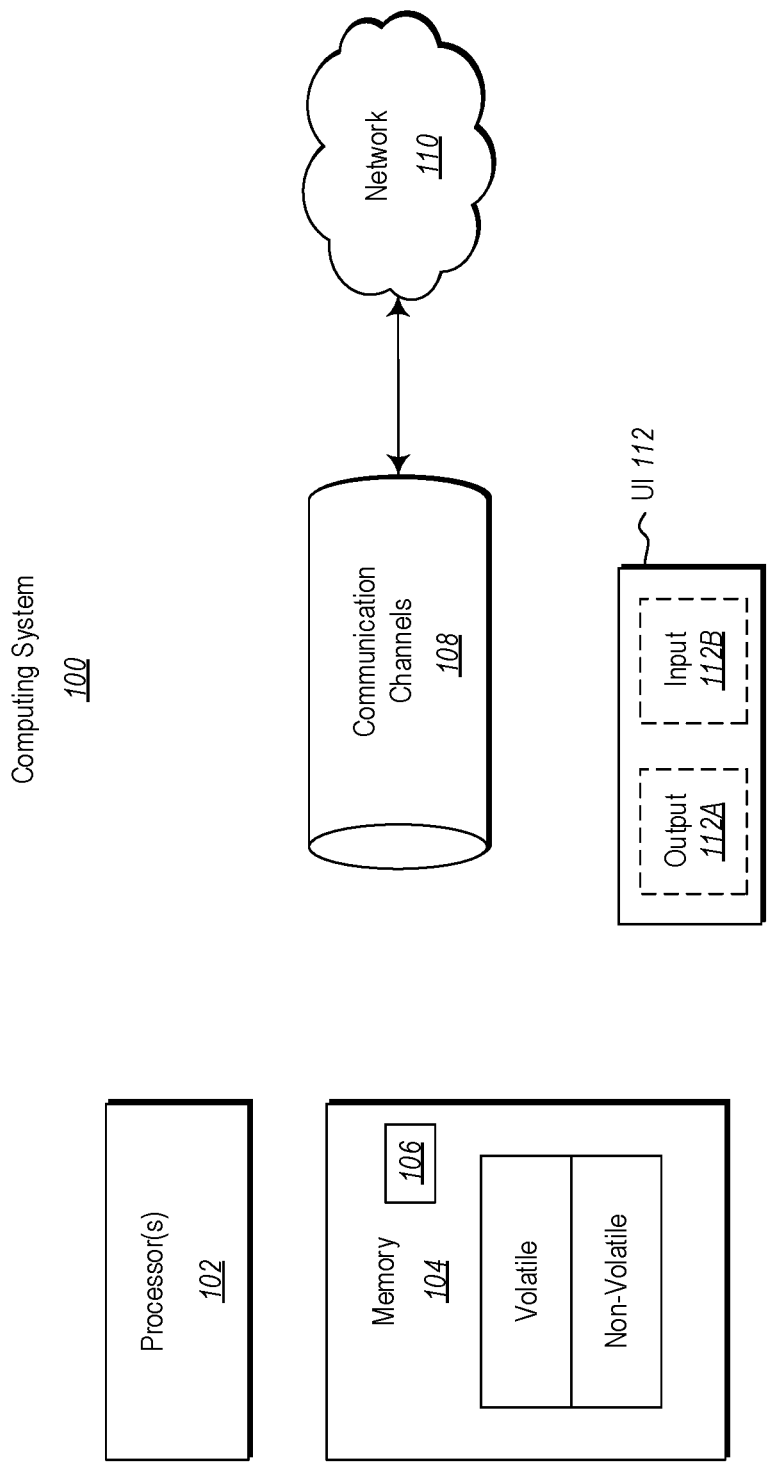
FIG. 1 illustrates an example computer system in which the principles described herein may be employed.

At least some embodiments described herein relate to technologies that allow for a significant reduction in the time required to incrementally build large computer programs, and to significantly increase the scale of build systems needed to produce those builds. The time reduction is caused by reducing the time required for processing systems in a distributed build system to acquire files needed for the respective processing systems to perform their respective part of the build. The scale increase is caused by the use of processing system caches and peer cache retrieval to reduce reliance on centralized resources.

This is done by establishing a tier of cache locations on which appropriate files for a build may be found by the appropriate processing system (e.g., a build worker). For instance, the files may be found on the processing system's own cache, or perhaps on a peer processing system in which the file may be retrieved without having to use an intervening computing system that operates above the routing layer. Build assignments may even be made by a scheduler in a manner to increase the likelihood that the appropriate files will be found at lower latency tiers in the ordered cache locations. Furthermore, when a subject processing system retrieves a file for its part of the build, it may publish the availability of the file on the processing system, particularly for those processing systems in which the subject processing system serves as a lower level cache location (e.g., for a peer processing system).

In accordance with some embodiments described herein, a system may be established that allows for the processing systems to validate that the files have not been tampered with by using signatures, and were appropriately identified. Such signatures may be used by ingestor components that search for and identify files that have been changed since the last build (and files that depend from those changed files), and logs the change in a centralized repository along with an indication of the appropriate credentials (e.g., a certificate chain) to be used in validating the signature. Thus, the efficient build may be securely performed.

Embodiments described herein also allow for builds to be performed in the context of increased scale and complexity of build systems. If many builds a day are to be performed, processing systems on the order of thousands or even more may be used in very large build systems to handle so many builds. Each processing system involved in a build needs its own copies of source code. Many or most or all of those processing systems may need to retrieve source code simultaneously. The principles described herein permit this to happen in an orderly way.

Because the principles described herein operate in the context of a computing system, a computing system will be described with respect to FIG. 1. Then, the principles of ingestion of changes in source code will be described with respect to FIGS. 2 and 3. Thereafter, the use of such ingested changes to efficiently build the computer program will be described with respect to FIGS. 4 through 7.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
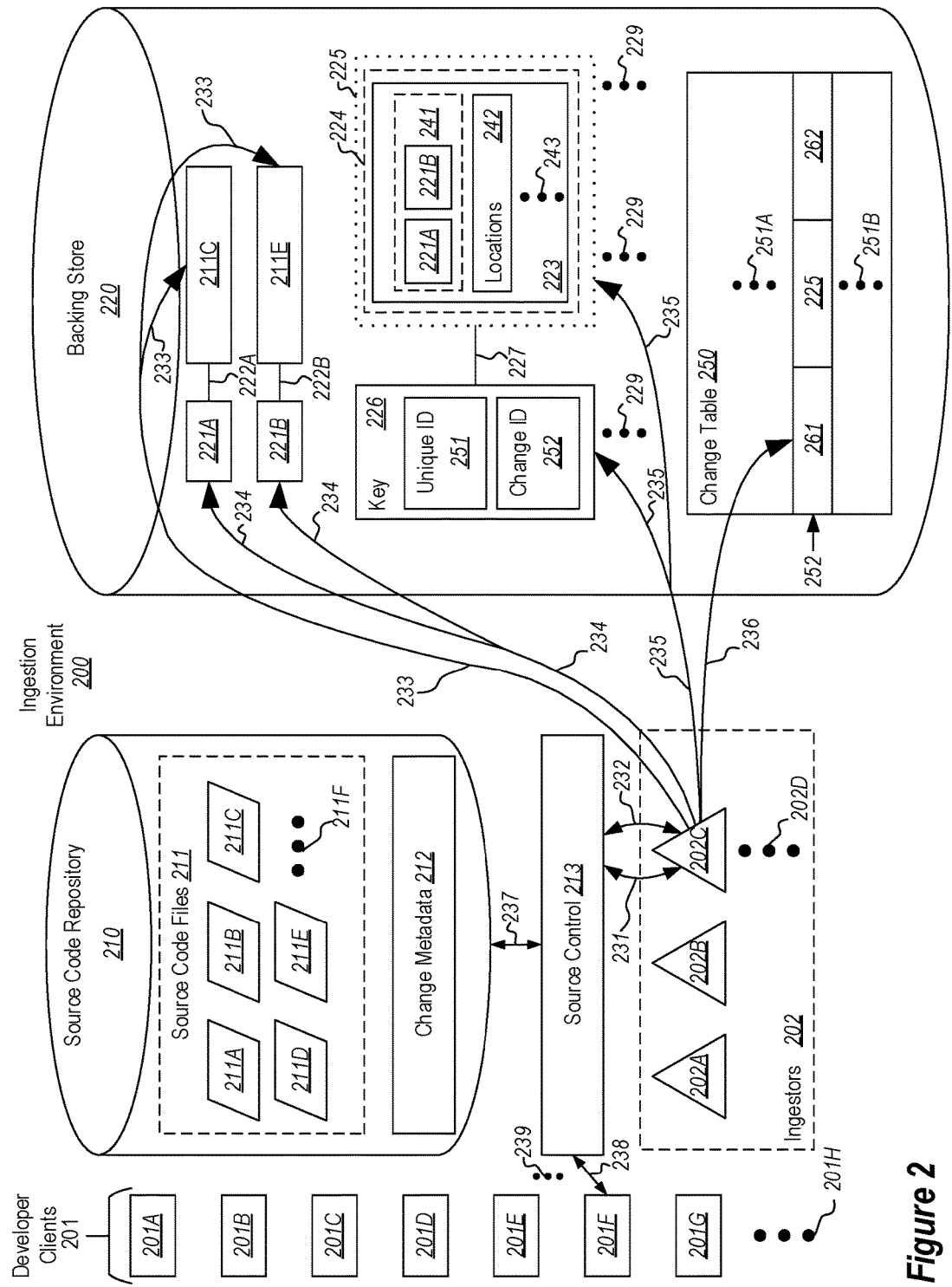
FIG. 2 illustrates an example ingestion environment in which changes in a program since the last build may be detected and logged (or "ingested") and represented in a backing store.

FIG. 2 illustrates an example environment 200 (hereinafter called the "ingestion environment") in which changes in the source code for a program since the last build may be detected and logged (collectively referred to hereinafter as "ingestion"). The ingestion environment 200 includes multiple developer clients 201, a source code repository 210, and a backing store 220. The source code repository 210 may also include or be interfaced with using a source control 213 (as represented by arrow 237). Ingestors 202 interface with the source code repository to "ingest" source code changes made since the last build as described in further detail hereinafter.

The multiple developer clients 201 are illustrated symbolically as small squares in FIG. 2. The multiple developer clients are or are run on computing systems on which developers contribute to the development of a computer program. Such computing systems may be structured as described for the computing system 100 of FIG. 1.

In large scale development projects, there may be thousands of developers and thus thousands of developer computing systems. Nevertheless, for illustrative purposes only, there are only seven developer computing systems 201A through 201G illustrated, with the ellipsis 201H represents the many more developer computing systems that will be present in the typical large-scale development of a large computer program.

The source code repository 210 stores many source code files 211 (illustrated symbolically as parallelograms in FIG. 2) that represents the past and current state of the source code of the computer program under development. There may be many (e.g., perhaps thousands or millions) of such source code files 211 in the typical large-scale computer program. However, for illustrative purposes only, there are only five files 211A through 211E illustrated, with the ellipsis 211F representing the many more files that will be present in the typical large-scale computer program. The source code repository 210 also includes change metadata 212.

A source control system 213 operates to provide source code files as requested by the various developer clients 201. The channel for communication between the developer clients 201 and the source control system 213 is represented by the arrow 238 (for the developer client 201F) and the ellipsis 239 (for the remainder of the developer clients 201).

The source control system 213 also manages the change metadata 212 so that when it detects that a developer has changed a source code file, the source control system 213 adds metadata regarding that change to the change metadata 212. The change metadata 212 regarding that change may include a unique change identifier, the author of the change, a description of the change, the file changes made for each source code change, or any other data that is helpful to building that change.

In some embodiments, the source control system 213 is distributed, so as to be closely available to the developer clients. For instance, there may be a front-end source control system for each server for a group of developer clients, or for each cluster of such servers. Each build requires anywhere from a few megabytes to terabytes of source code to be delivered to each developer client and kept up to date. The source control system 213 abstracts the details of each source control server behind a unified set of concepts including storage snapshot metadata and content-addressable storage for source code files. The source control system 213 also provides an appropriate edit lock on a source code file when the source code file is being edited by a developer client 201.

The ingestion system 200 also includes ingestors 202, which are illustrated as triangular in FIG. 2 simply to distinguish them from the developer clients 201. The ingestors are another type of computing system that is authorized to use the source control system 213. The ingestors are software processes that runs through the various change metadata 212 in the source control system 213, and store the results in the backing store 220. There are three ingestors 202A, 202B and 202C illustrated in FIG. 2. However, the ellipsis 202D represents that there may be many more ingestors. An ingestor 202 may be for instance a computing system (such as the computing system 100 described with respect to FIG. 1), a process running on such a computing system, a virtual machine, or multiple or combinations thereof.

Figure 3:
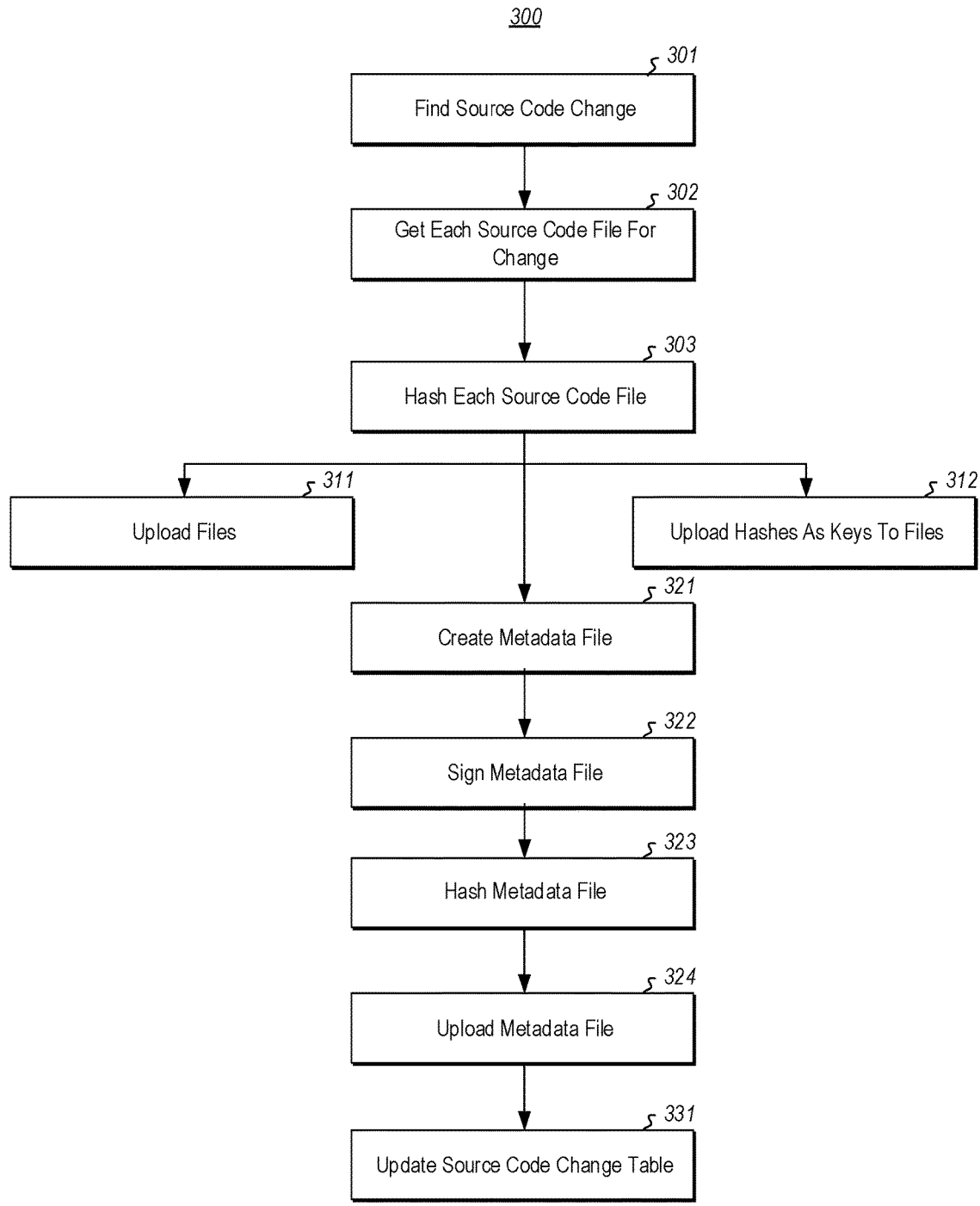
FIG. 3 illustrates a flowchart of a method for ingesting new source code changes, which may be performed in an ingestion environment such as the example ingestion environment of FIG. 2.

The remaining portions of FIG. 2 will be described with respect to FIG. 3, which illustrates a flowchart of a method 300 for ingesting new source code changes. The method 300 of FIG. 3 is performed by an ingestor each time the ingestor finds a new source code change via evaluation of the change metadata provided by the source control system 213, and results in data structures being created and edited within the backing store. There are several arrows illustrated in FIG. 2, and several data structures illustrated within the backing store 220, which are relevant to an ingestor 202C ingesting a single change that it has identified as having occurred since the last build. In this particular change, which will be referred to hereinafter as an "example particular change", the ingestor 202C identifies a change involving two source code files (e.g., source code file 211C and 211E). For instance, suppose that source code file 211C was identified as having been edited since the last build, and source code file 211E was identified as having a dependency on source code file 211C. The files 211C and 211E should then be built together.

Referring to FIG. 2, as represented by bidirectional arrow 231, the ingestor 202C finds a new source code changes (act 301 in FIG. 3). This triggers the performance of the method 300 by the ingestor 202C. The ingestor 202C then, as represented by bi-directional arrow 232 gets each source code file in the corresponding change (act 302 in FIG. 3). The ingestor 202C hashes the content of the file (act 303). Suppose that the hash of file 211C is hash 221A, and the hash of file 211E is hash 221B. The ingestor then uploads, the files (act 311) (as represented in FIG. 2 by the double-headed arrow 233) and the content hashes (act 312) (as represented in FIG. 2 by the double headed arrow 234) to the backing store 220 with the files keyed by the content hash. As a result, the files 212C and 212E are each stored within the backing store 220. The file 212C is keyed by the content hash 221A as represented by the line 222A. The file 212E is keyed by the content hash 221B as represented by the line 222B. Note that the uploading of the files and the hashes that they are keyed on (acts 311 and 312) may occur substantially simultaneously as part of one atomic act.

The ingestor further creates a metadata file (act 321) containing information about the change. The metadata file 223 includes the set 241 of all content hashes 222A and 222B for the change and locations 242 (e.g., in a filesystem) at which to place the corresponding files. As represented by the ellipsis 243, the metadata file 223 may include any other information useful for understanding the change. Such other information might include the change identifier for the metadata file, an author of the change, a description of the change, and so forth.

The ingestor digitally signs the metadata file (act 322) as represented by dashed-lined box 224 in FIG. 2. This could be performed by a private key portion of a public-private key pair. A certificate may further be attached to the signature. The digital signing of the metadata file allows the validation of the metadata file by the consumer of the metadata file (which will be a build processing system described further below). To increase security, the private keys might only assigned to the ingestor for use in signing the metadata file. In some embodiments, each ingestor shares the same private key and certificate, though the principles described herein are not limited to such sharing amongst ingestors. The ingestor then hashes the final content of the signed metadata (act 323) (as represented by dotted-lined box 225 in FIG. 2). Furthermore, as represented by the double-headed arrow 235, the ingestor 202C uploads the metadata file 223 (act 324) to the backing store 220 under a key 226 composed of a unique identifier 251, and the change identifier for the change 252.

The ellipses 229 represent that the data structures represented above the ellipses 229 may be present for each change. In other words, there may be at least one appropriately keyed metadata file uploaded for each change detected since the last build. Furthermore, there may be at least one file appropriate keyed for each metadata file.

After having made the change, the ingestor 202C then updates a source code change table (act 331) (as represented by arrow 236) to include information about the change to the change. For instance, the backing store 220 is illustrated as including a source code change table 250. As represented by the ellipses 251A and 251B, the source code change table may include multiple rows. Each row in the change table corresponds to a detected change. A single row 252 is focused on within the change table 250 since this single row contains represents the example particular change. The row 252 includes change information 261 for the particular example change, the content hash 225 of the metadata file 225, and a certificate chain 262 to be used to validate the signed metadata file 224.

Although the backing store 220 and the source code repository 210 are illustrated as being two separate stores in FIG. 2, some or all of the stores 210 and 220 may be combined. For instance, in one embodiment, each of one, some or all of the data structures shown within the backing store 220 are instead written to the source code repository 210. Nevertheless, because the backing store 220 serves as a boundary between the ingestion environment 200 of FIG. 2, and a build environment 300 of FIG. 3, it is helpful for clarity to illustrate the data structures that are output from the ingestion (and that serve as input to the build process), within a separate store.

Figure 4:
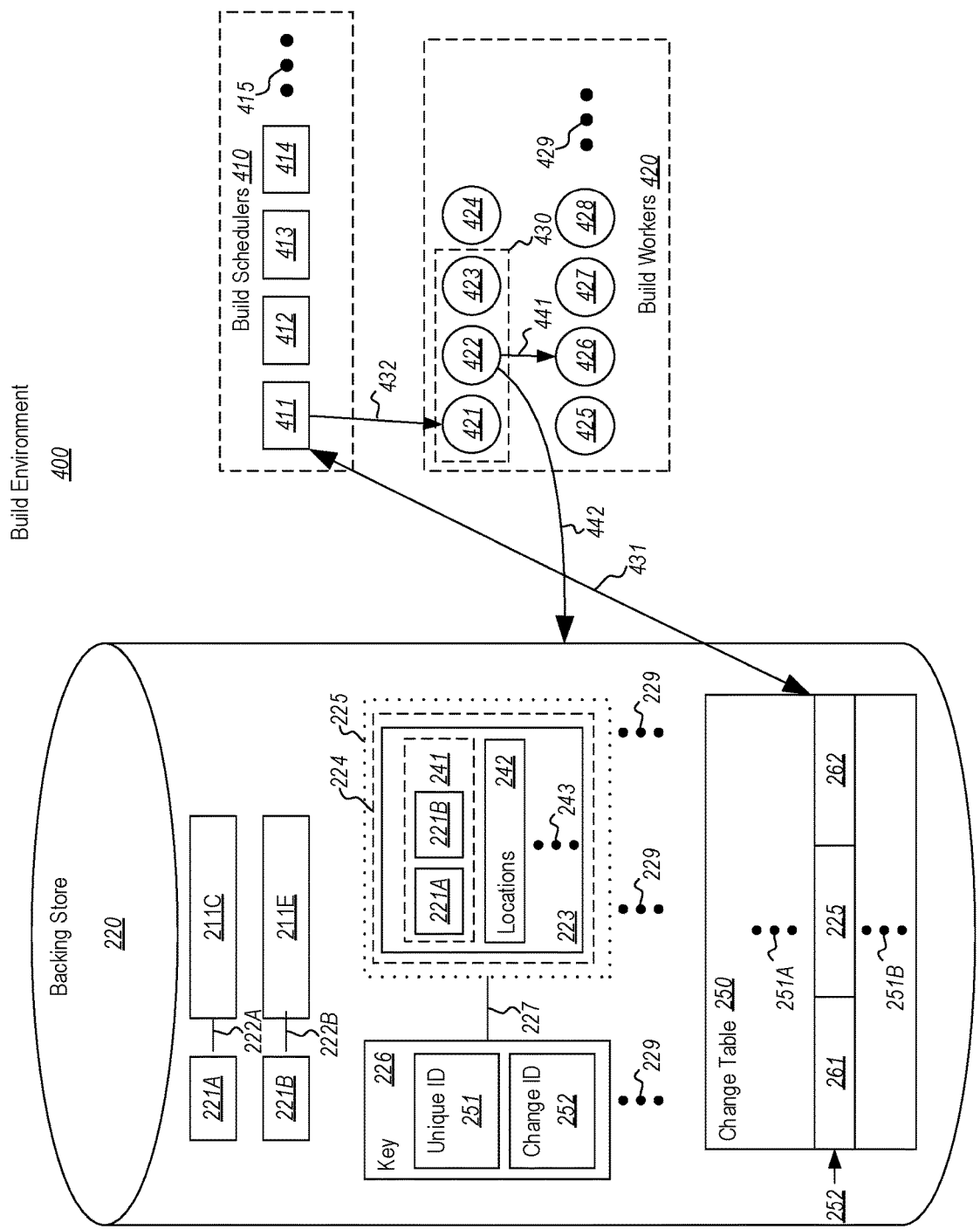
FIG. 4 illustrates an example build environment in which the principles described herein may operate, in which schedulers operate to use the backing store to detect build changes and assign changes to build workers, which build workers also use information in the backing store to perform their respective portion of the build.

FIG. 4 illustrates a build environment 400 in which the principles described herein may operate. The build environment 400 and the ingestion environment 200 share the backing store 220. Accordingly, the backing store 220 of FIG. 2 is also illustrated in FIG. 4. The build environment 400 includes a pool of schedulers 410 that each uses information about changes to source code to decide to run builds using the source code changes. The build environment also includes build workers 420, which is a potentially very large set of machines and/or processes that actually run a build in response to requests from the schedulers 420. The build workers are directed to retrieve source code at specific change identifiers and retrieve metadata and files to fulfill the build. The build workers are examples of the build processing systems (sometimes also called simply "processing systems") described above.

In the illustrated build environment 400, the schedulers 410 are illustrated as including four schedulers 411, 412, 413 and 414. However, the ellipsis 415 represents that there may be any number of schedulers that operate to use information about changes to source code to decide to run builds and submit worker requests to the workers 420. For instance, there may be as few as one scheduler, but may be potentially a larger number of schedulers. The build workers 420 are illustrated as including eight build workers 421 through 428. However, the ellipsis 429 represents that there may be any number of build worker from which the schedulers may use to perform build work. There may potentially be hundreds or thousands of build workers in a large software project when builds are to occur relatively quickly. The remaining arrows and components illustrated in FIG. 4 will be described with respect to FIGS. 5 through 7.

The build schedulers 410 are each symbolized as squares and the build workers 420 are each symbolized as circles to emphasize their different function. The build schedulers 410 may each be computing systems (such as the computing system 100 described with respect to FIG. 1), a process that runs on such a computing system, or a virtual machine. Likewise, the build workers 420 may also each be computing systems (such as the computing system 100 described with respect to FIG. 1), a process that runs on such a computing system, or a virtual machine.

Figure 5:
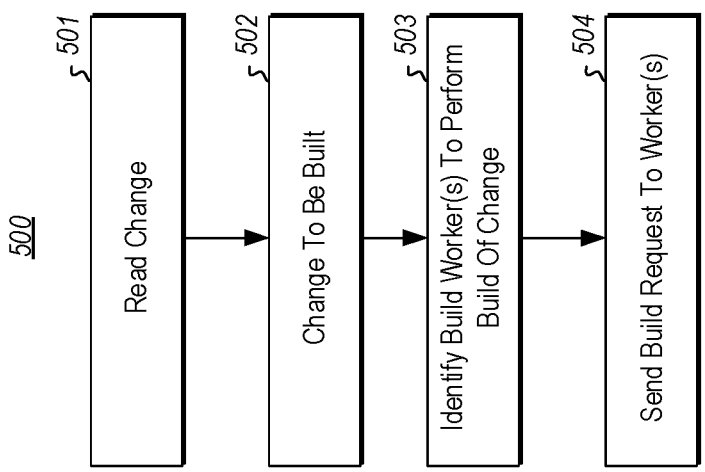
FIG. 5 illustrates a flowchart of a method for scheduling a build, which method may be performed by schedulers such as the schedulers illustrated in the example build environment of FIG. 4.

FIG. 5 illustrates a flowchart of a method 500 for scheduling a build. The method 500 may be performed by any and all of the build schedulers 410 of FIG. 4. Accordingly, the method 500 of FIG. 5 will now be described with respect to the build schedulers 410 of FIG. 4. A build scheduler may repeatedly perform the method 500 as it works through changes made since the last build (e.g., in the source code change table 250). For instance, suppose the build scheduler 411 is to schedule a build of the example particular change represented in the row 252.

The build scheduler reads the latest information from the change table (act 501) to determine whether a change should be built (act 502). For instance, in FIG. 4, the build scheduler 411 reads the change table 250 (as represented by arrow 431) and evaluates row 252. The build scheduler 411 may then determine that the change represented by the change information 261 is to be built (act 502).

In response to a determination that a build of a change is to be made (act 502), the build scheduler identifies a build worker or group of build workers that is to perform the build (act 503). The build scheduler than assigns the build change to the build worker or group of workers by sending a build request to the build worker or group of build workers (act 504).

For instance, in FIG. 4, the build scheduler 411 may determine that the build worker 421 is to perform the build (act 503). In that case, the build scheduler 411 sends a build request to the build worker 421 (act 504) as represented by arrow 432 in FIG. 4. Alternatively, the build scheduler 411 may determine that the build workers 421, 422 and 423 are to collaboratively perform the build (as symbolized in FIG. 4 by the dashed-lined box 430). In that case, the build schedulers 411 may send the build request to one of the build workers (e.g., build worker 421) (as also represented by the arrow 432 in FIG. 3), which may then act to manage the work performed by each of the build workers assigned to perform the build.

Alternatively or in addition, a build worker that is assigned to perform a build may enlist one or more other build workers to help in the assigned build. In that case, the assignments should be reported to the build schedulers 410 so as to be properly factored into future build scheduling.

Figure 6:
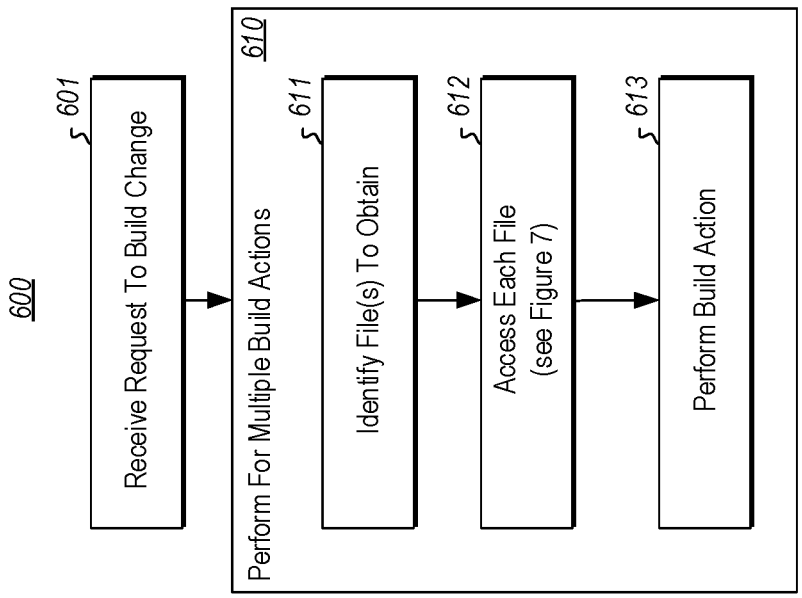
FIG. 6 illustrates a flowchart of a method for performing at least a portion of a build of a computer program, which method may be performed by processing systems such as the build workers illustrated in the example build environment of FIG. 4.

FIG. 6 illustrates a flowchart of a method 600 for performing at least a portion of a build of a computer program. The method 600 may be performed by a build worker (e.g., build worker 421) in response to receiving a request (e.g., the request represented by arrow 432 in FIG. 4) to perform a portion of a build of a computer program (act 601). Accordingly, the method 600 will now be described with reference to FIG. 4.

As previously mentioned, the method 600 is initiated upon receiving a request to perform a portion of a build of a computer program (act 601). This request may include a change identifier that corresponds to one or more files of the computer program that changed since the last build (e.g., in the example particular change, the source code file 211C was identified by the ingestor 202C as having been edited since the last build) and/or which depend upon a change made since the last build (e.g., in the example particular change, the source code file 211E was identified by the ingestor 202C as having been edited since the last build).

There are several build actions that may then be performed, in which a subsequent build action relies upon the results of a prior build action. Accordingly, box 610 is provided in order to symbolize that its contents (i.e., acts 611, 612 and 613) may be performed in sequence for multiple build actions, each build action representing a stage of the entire build process. For instance, in one example, there is a two stage build process in which the build action in the first stage is to use the metadata file to identify the one or more source code files associated with the change, and the build action in the second stage is to acquire and build the change using the source code files.

For the first build action (the first performance of the content of box 610), the build worker identifies at least one file (e.g., the hashed signed metadata file 225 in the example particular change) that is to be used to perform a first build action that comprises identifying one or more other files (e.g., the source code files 211C and 211E in the example particular change) (act 611).

Figure 7:
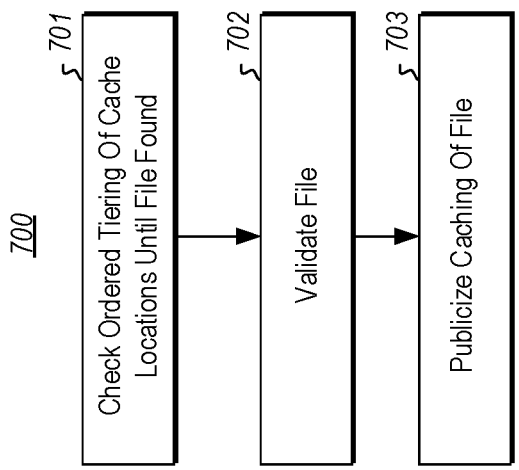
FIG. 7 illustrates a method for gaining access to files used to build, which method may be performed by the processing systems, such as the build workers illustrated in the example build environment of FIG. 4, when accessing build files in performance of the method of FIG. 6.

As part of this first build action, the assigned build worker gains access to each of the at least one files (act 612) (e.g., the metadata file 223) by performing the method 700 of FIG. 7. For each of the files to be accessed. Specifically, the assigned build worker checks an ordered tiering of cache locations until the particular file is found (act 701). This ordered tiering might be ordered by latency in file retrieval and/or by any other suitable caching performance parameter. Additionally, the use of file retrieval from peer processing systems bypasses centralized resources in higher tiers. The process of checking cached tiers first is represented by the arrow 441 in FIG. 4. The concept of the backing store 220 serving as a final tier for checking for files is represented by the arrow 442.

In one example, the build worker first checks a cache location physically present on its own computing system. The build worker might then check any peer computing systems (e.g., such as other build workers) that can be accessed without an intervening computing system, if any, needing to operate at higher than a routing layer. Other further examples of cache tiering might be cache locations within the same rack, cache locations within the same aisle of a datacenter, cache locations within the same datacenter, cache locations within datacenters in the same region (or other regionally centralized location of files for the build of the computer program), and finally a universally centralized location of files for the build of the computer program. Once accessed, the hash signed metadata file may then be used as a key to acquire the signed metadata file.

As part of gaining access, the build worker may then validate the particular file (e.g., the signed metadata file 234) (act 702). For instance, build worker may use the public key portion of the public-private key pair (for which the private key was used by the ingestor 202C), the certificate chain 262 provided in the build request, and the signature of the signed metadata file 234 to validate that the particular metadata file was signed by one of the ingestors 202C in the ingestor environment 200 of FIG. 2. Then, so that the particular file may be used in future ordered caching checks, the build worker publishes that it has the particular file in its own cache (act 703).

The build worker then enumerates the (filesystem path, hash) pairs (e.g., pairs 221A-211C and 221B-211E, to identify the source code files (e.g., 211C and 211E) associated with the change (act 613), which also serves as act 611 in the second build action. For each identified source code file (each of file 211C and file 211E), the build worker gains access to the file (act 612 for the second iteration of the content of box 610). This may again be accomplished using an ordered tiering (act 701), which may be the same as, or different from, the ordered tiering performed in the first stage of the build process. While validation of the file need not be performed in this second stage of the build process, once the build worker has the source code file, the build worker may publish that the build worker has the source code file (act 703), so that other build workers might more quickly acquire the source code file if needed. The build working may then build the change using the acquired source code file(s) (act 613).

Accordingly, by using an ordered tiering of cache locations to perform build actions, there is a significant reduction in the time required to incrementally build large computer programs, and a significant increase in the ability to scale build systems to a larger number of processing systems. The reduction in time is caused by reducing the time required for processing systems in a distributed build system to acquire files needed for the respective processing system to perform their respective part of the build. The increase in scale is caused by the use of processing system caches and peer cache retrieval to reduce reliance on centralized resources.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable media having stored thereon computer-executable instructions that are structured such that, when executed by the one or more processors, the computer-executable instructions cause the computing system to perform at least a portion of a build of a computer program, the computer-executable instructions including instructions that cause the computing system to at least:
receive an assignment to perform a portion of a build of a computer program, the assignment being associated with a change identifier that corresponds to a change made in a source code repository to one or more files;
access metadata associated with the change identifier to identify the one or more files, which are to be used to perform a build action, including accessing from the change metadata one or more content hashes that is each a key for obtaining a corresponding one of the one or more files from one or more storage locations;
gain access to each of the one or more files by using the one or more content hashes to check an ordered tiering of cache locations until each file is found; and
use the one or more files to perform the build action.

2. The computing system in accordance with claim 1, the build action comprising an act of building the assigned portion of the computer program.

3. The computing system in accordance with claim 1, wherein the one or more files have changed since a last build, or depend upon a change made since the last build.

4. The computing system in accordance with claim 1, wherein accessing metadata associated with the change identifier to identify the one or more files comprises referencing a change table using the change identifier.

5. The computing system in accordance with claim 1, wherein gaining access to each of the one or more files comprises, for at least one of the one or more files, publishing to one or more other computing systems that the computing system has the at least one file.

6. The computing system in accordance with claim 5, wherein publishing to the one or more other computing systems that the computing system has the at least one file comprises providing the at least one file to a particular computing system of the one or more other computing systems.

7. The computing system in accordance with claim 1, wherein gaining access to each of the one or more files comprises validating each of the one or more files.

8. The computing system in accordance with claim 7, wherein validating each of the one or more files comprises validating each file as having been signed by a valid ingestor computing system, the ingestor computing system searching files of the computer program for changes made since a last build of the computer program.

9. The computing system in accordance with claim 1, the ordered tiering of cache locations comprising a peer computing system that can be accessed without an intervening computing system, if any, needing to operate at higher than a routing layer.

10. The computing system in accordance with claim 9, a first tier of cache locations in the ordered tiering being a cache location physically present on the computing system.

11. The computing system in accordance with claim 10, a final tier of cache locations in the ordered tiering being a universally centralized location of files for the build of the computer program.

12. The computing system in accordance with claim 9, a final tier of cache locations in the ordered tiering being a universally centralized location of files for the build of the computer program.

13. The computing system in accordance with claim 9, a final tier of cache locations in the ordered tiering being a regionally centralized location of files for the build of the computer program.

14. The computing system in accordance with claim 1, the ordered tiering being ordered by latency in file retrieval.

15. A method for performing at least a portion of a build of a computer program, the method comprising:
receiving an assignment to perform a portion of a build of a computer program, the assignment being associated with a change identifier that corresponds to a change made in a source code repository to one or more files;
access metadata associated with the change identifier to identify the one or more files, which are to be used to perform a build action, including accessing from the change metadata one or more content hashes that is each a key for obtaining a corresponding one of the one or more files from one or more storage locations;
gaining access to each of the one or more files by using the one or more content hashes to check an ordered tiering of cache locations until each file is found; and
using the one or more files to perform the build action.

16. The method in accordance with claim 15, wherein accessing metadata associated with the change identifier to identify the one or more files comprises referencing a change table using the change identifier.

17. The method in accordance with claim 15, wherein gaining access to each of the one or more files comprises, for at least one of the one or more files:
publishing to one or more other computing systems that the computing system has the at least one file; and
providing the at least one file to a particular computing system of the one or more other computing systems.

18. The method in accordance with claim 15, wherein gaining access to each of the one or more files comprises validating each of the one or more files.

19. The method in accordance with claim 15, the ordered tiering of cache locations comprising a peer computing system that can be accessed without an intervening computing system, if any, needing to operate at higher than a routing layer.

20. A computer program product comprising one or more computer-readable storage media having thereon computer-executable instructions that are structured such that, when executed by one or more processors of a computing system, cause the computing system to perform at least a portion of a build of a computer program, the computer-executable instructions including instructions that are structured to cause the computing system to perform at least the following:
receive an assignment to perform a portion of a build of a computer program, the assignment being associated with a change identifier that corresponds to a change made in a source code repository to one or more files;
access metadata associated with the change identifier to identify the one or more files, which are to be used to perform a build action, including accessing from the change metadata one or more content hashes that is each a key for obtaining a corresponding one of the one or more files from one or more storage locations;
gain access to each of the one or more files by using the one or more content hashes to check an ordered tiering of cache locations until each file is found; and
use the at one or more files to perform the build action.

* * * * *